(12) United States Patent
Cuza

(10) Patent No.: US 6,431,410 B1
(45) Date of Patent: Aug. 13, 2002

(54) RICE DISPENSING SYSTEM

(76) Inventor: Carlos Cuza, 29189 E. Portales Dr., Cathedral City, CA (US) 92234

( * ) Notice: Subject to any disclaimer, the term of this patent is extended or adjusted under 35 U.S.C. 154(b) by 0 days.

(21) Appl. No.: 10/015,232

(22) Filed: Dec. 12, 2001

(51) Int. Cl.[7] .............................................. G01G 11/10
(52) U.S. Cl. .......................... 222/371; 222/55; 141/192
(58) Field of Search ............................. 222/55, 65, 161, 222/162, 371, 132, 196, 246, 450; 141/95, 192

(56) References Cited

U.S. PATENT DOCUMENTS

| | | | |
|---|---|---|---|
| 2,684,781 A | * 7/1954 | Allen et al. | 222/371 |
| 4,733,891 A | * 3/1988 | Cervinka | 222/371 |
| 5,007,561 A | * 4/1991 | Wahl et al. | 222/55 |
| 5,074,435 A | * 12/1991 | Suverkrop et al. | 222/55 |

* cited by examiner

*Primary Examiner*—Philippe Derakshani
*Assistant Examiner*—Thach H. Bui
(74) *Attorney, Agent, or Firm*—Goldstein & Lavas, P.C.

(57) ABSTRACT

A rice dispensing system used to store and dispense measured quantities of rice at a single pressing of a button comprised of a housing having an open upper end, an open lower end, a front wall, a back wall, and opposed side walls. The housing has a tapered compartment disposed within the open upper end. The tapered compartment has an open lower end. The tapered compartment holds a quantity of rice therein. The housing has a dispensing funnel disposed within the open lower end thereof. The dispensing funnel has an open upper end and an open lower end. A conveyor system is disposed within the housing disposed below the tapered compartment. The conveyor system serves to deliver rice from the tapered compartment to the dispensing funnel. A timer system is in communication with the conveyor system. The timer system controls the activation of the conveyor system for predetermined lengths of time.

6 Claims, 2 Drawing Sheets

RICE DISPENSING SYSTEM

BACKGROUND OF THE INVENTION

The invention relates to a rice dispensing system that is used to store and dispense measured quantities of rice at a single pressing of a button.

People who use rice are required to measure out a selected quantity using a measuring cup or the like and then add the measured quantity of rice to an awaiting pot of boiling water. The rice is normally stored in a cupboard or pantry that will require a person to retrieve the rice when needed. The person then needs to locate a measuring cup to measure the required amount of rice needed.

The present invention can be positioned directly on a kitchen counter adjacent to a stove so that a person can easily retrieve a requisite amount of rice when needed without having to retrieve a box or rice or locate a measuring cup.

Several references show various food dispensing devices. U.S. Pat. No. 4,993,593 to Fabiano discloses a device capable of automatically dispensing a pre-measured flowable medium. U.S. Pat. No. 5,855,300 to Malki discloses a device for dispensing a pre-measured amount of a solid powder or granular material such as sugar. U.S. Pat. No. 5,975,366 to Ridgely discloses a device for storing and dispensing several powdered materials.

While these units may be suitable for the particular purpose employed, or for general use, they would not be as suitable for the purposes of the present invention as disclosed hereafter.

SUMMARY OF THE INVENTION

It is an object of the invention to produce a housing having a generally rectangular configuration. The housing has an open upper end, an open lower end, a front wall, a back wall, and opposed side walls. The open upper end has a lid hingedly coupled thereto. The lid seals the open upper end in a closed orientation. The housing includes an L-shaped support stand extending downwardly therefrom. The support stand includes a vertical segment extending downwardly from the back wall. The support stand includes a horizontal segment extending forwardly from a lower edge of the vertical segment. The horizontal segment is positioned below the open lower end of the housing. The housing has a tapered compartment disposed within the open upper end. The tapered compartment has an open lower end. The tapered compartment holds a quantity of rice therein. The housing has a dispensing funnel disposed within the open lower end thereof. The dispensing funnel has an open upper end and an open lower end. A conveyor system is disposed within the housing disposed below the tapered compartment. The conveyor system serves to deliver rice from the tapered compartment to the dispensing funnel. The conveyor system includes a continuous loop belt disposed around a pair of spaced apart rotatable sprockets. The belt has a plurality of spaced apart lips extending upwardly therefrom. The conveyor system includes a motor coupled with one of the sprockets. A timer system is in communication with the conveyor system. The timer system controls the activation of the motor of the conveyor system for predetermined lengths of time. The timer system includes a plurality of activation buttons disposed in the front wall of the housing. Each of the buttons activates the motor at predetermined intervals corresponding with a selected quantity of rice to be dispensed into the dispensing funnel.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

It will be noted in the various figures that the devices relates to rice dispensing system used to store and dispense measured quantities of rice at a single pressing of a button. It its broadest context, the device consists of a housing, a conveyor system, and a timer system. Such components are individually configured and correlated with respect to each other so as to attain the desired objective.

Figure 1:
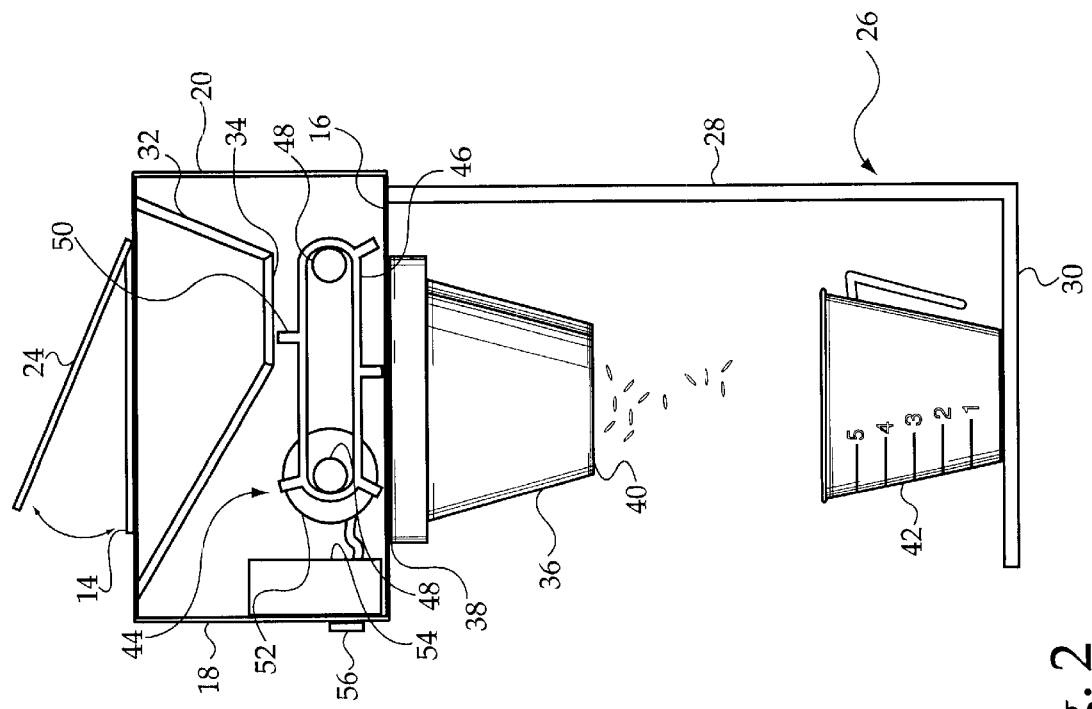
FIG. 1 is a perspective view of the preferred embodiment of present invention constructed in accordance with the principles of the present invention.
Figure 2:
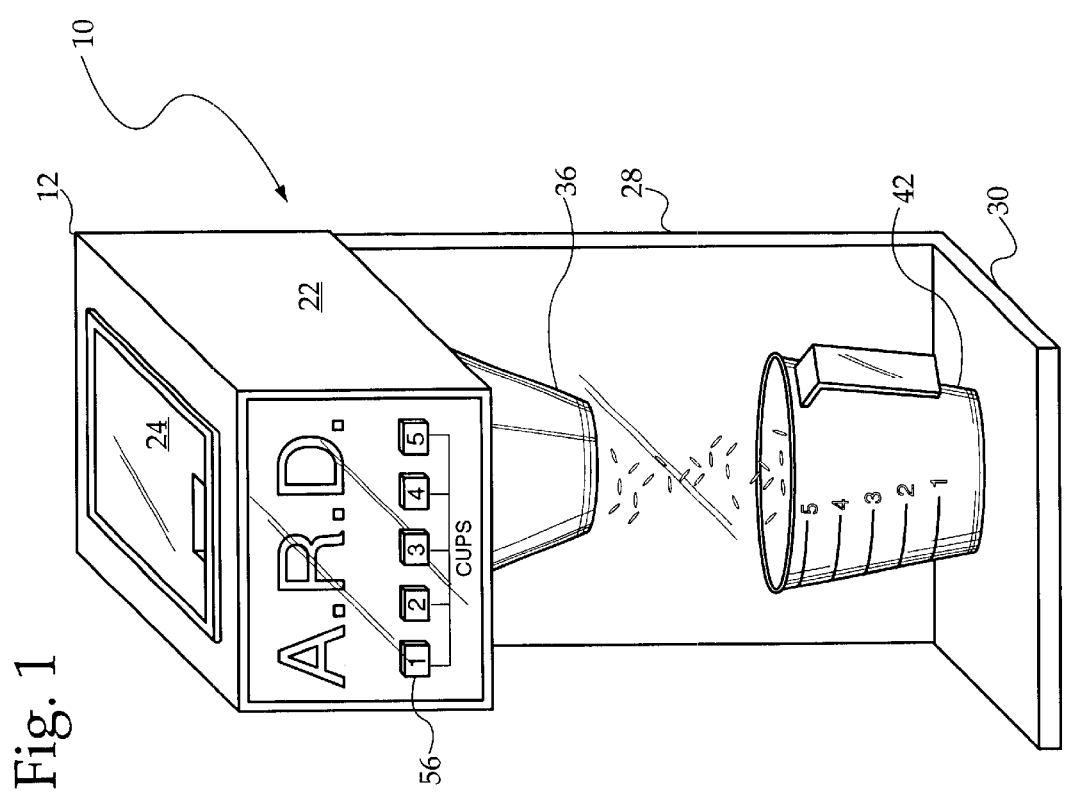
FIG. 2 is a side view of the present invention illustrated in use.
Figure 3:
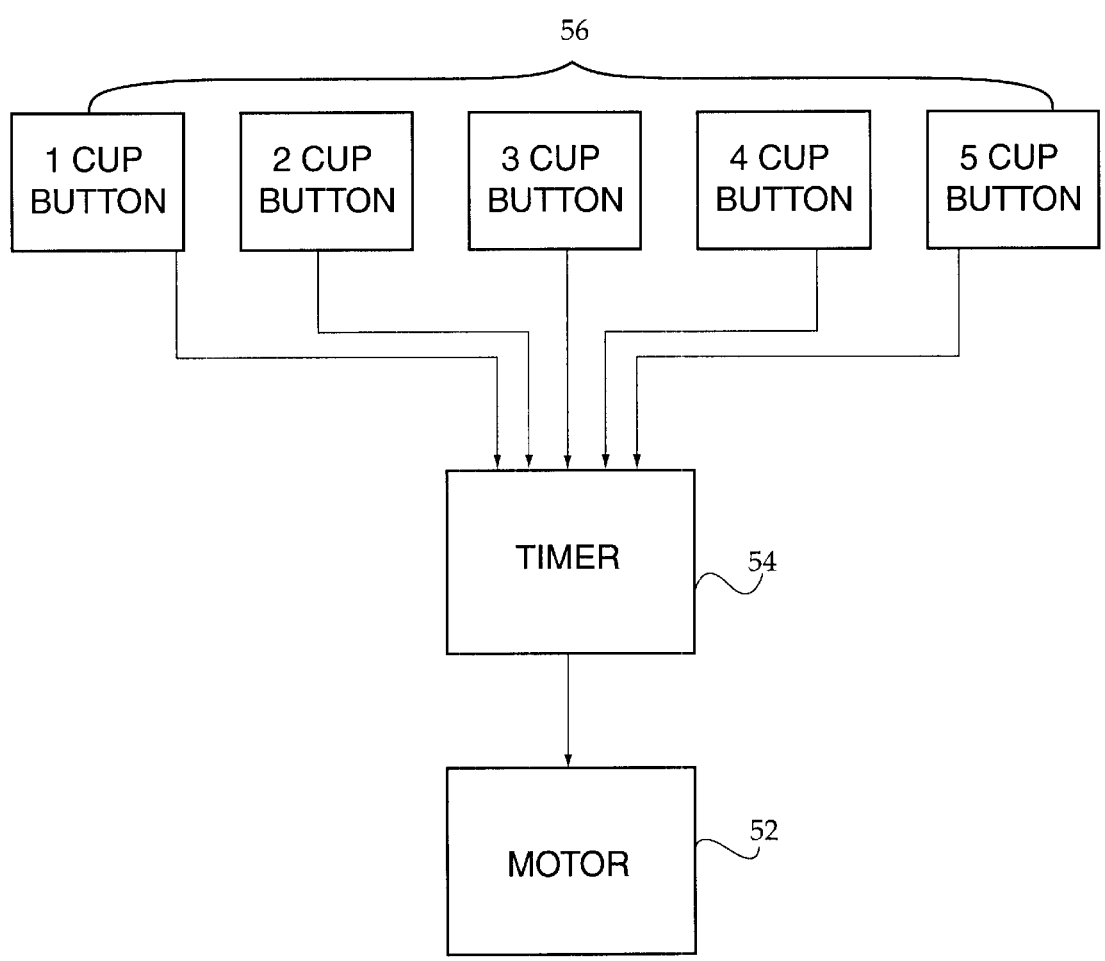
FIG. 3 is a schematic illustration of the operability of the present invention.

The housing 12 has a generally rectangular configuration. The housing 12 has an open upper end 14, an open lower end 16, a front wall 18, a back wall 20, and opposed side walls 22. The open upper end 14 has a lid 24 hingedly coupled thereto. The lid 24 seals the open upper end 14 in a closed orientation. The housing 12 includes an L-shaped support stand 26 extending downwardly therefrom. The support stand 26 includes a vertical segment 28 extending downwardly from the back wall 20. The support stand 26 includes a horizontal segment 30 extending forwardly from a lower edge of the vertical segment 28. The horizontal segment 30 is positioned below the open lower end 16 of the housing 12. The housing 12 has a tapered compartment 32 disposed within the open upper end 14. The tapered compartment 32 has an open lower end 34. The tapered compartment 32 holds a quantity of rice therein. The housing 12 has a dispensing funnel 36 disposed within the open lower end 16 thereof. The dispensing funnel 36 has an open upper end 38 and an open lower end 40. The dispensing funnel 36 will ultimately dispense quantities of rice into an awaiting measuring cup 42 or the like that is positioned on the horizontal segment 30. Note FIGS. 1 and 2.

The conveyor system 44 is disposed within the housing 12 disposed below the tapered compartment. The conveyor system 44 serves to deliver rice from the tapered compartment 32 to the dispensing funnel 36. The conveyor system 44 includes a continuous loop belt 46 disposed around a pair of spaced apart rotatable sprockets 48. The belt 46 has a plurality of spaced apart lips 50 extending upwardly therefrom. The conveyor system 44 includes a motor 52 coupled with one of the sprockets. When the belt 46 is in motion, the lips 50 will push the rice down into the dispensing funnel 36.

The timer system 54 is in communication with the conveyor system 44. The timer system 54 controls the activation of the motor 52 of the conveyor system 44 for predetermined lengths of time. The timer system 54 includes a plurality of activation buttons 56 disposed in the front wall 18 of the housing 12. Each of the buttons 56 activate the motor 52 at predetermined intervals corresponding with a selected quantity of rice to be dispensed into the dispensing funnel 36. Each button 56 will prompt the timer system 54 to power the motor 52 for a predetermined interval sufficient to dispense the selected quantity. In the preferred embodiment, the buttons 56 will be programmed for dispensing the rice in cup intervals.

What is claimed is:

1. A rice dispensing system used to store and dispense measured quantities of rice at a single pressing of a button, comprising, in combination:

a housing having a generally rectangular configuration, the housing having an open upper end, an open lower end, a front wall, a back wall, and opposed side walls, the open upper end having a lid hingedly coupled thereto, the lid sealing the open upper end in a closed orientation, the housing including an L-shaped support stand extending downwardly therefrom, the support stand including a vertical segment extending downwardly from the back wall, the support stand including a horizontal segment extending forwardly from a lower edge of the vertical segment, the horizontal segment being positioned below the open lower end of the housing, the housing having a tapered compartment disposed within the open upper end, the tapered compartment having an open lower end, the tapered compartment holding a quantity of rice therein, the housing having a dispensing funnel disposed within the open lower end thereof, the dispensing funnel having an open upper end and an open lower end;

a conveyor system disposed within the housing disposed below the tapered compartment, the conveyor system serving to deliver rice from the tapered compartment to the dispensing funnel, the conveyor system including a continuous loop belt disposed around a pair of spaced apart rotatable sprockets, the belt having a plurality of spaced apart lips extending upwardly therefrom, the conveyor system including a motor coupled with one of the sprockets; and a timer system in communication with the conveyor system, the timer system controlling the activation of the motor of the conveyor system for predetermined lengths of time, the timer system including a plurality of activation buttons disposed in the front wall of the housing, each of the buttons activating the motor at predetermined intervals corresponding with a selected quantity of rice to be dispensed into the dispensing funnel.

2. A rice dispensing system used to store and dispense measured quantities of rice at a single pressing of a button, comprising, in combination:

a housing having an open upper end, an open lower end, a front wall, a back wall, and opposed side walls, the housing having a tapered compartment disposed within the open upper end, the tapered compartment having an open lower end, the tapered compartment holding a quantity of rice therein, the housing having a dispensing funnel disposed within the open lower end thereof, the dispensing funnel having an open upper end and an open lower end;

a conveyor system disposed within the housing disposed below the tapered compartment, the conveyor system serving to deliver rice from the tapered compartment to the dispensing funnel;

a timer system in communication with the conveyor system, the timer system controlling the activation of the conveyor system for predetermined lengths of time.

3. The rice dispensing system as set forth in claim 2, wherein the open upper end of the housing has a lid hingedly coupled thereto, the lid sealing the open upper end in a closed orientation.

4. The rice dispensing system as set forth in claim 2, wherein the housing includes an L-shaped support stand extending downwardly therefrom, the support stand including a vertical segment extending downwardly from the back wall, the support stand including a horizontal segment extending forwardly from a lower edge of the vertical segment, the horizontal segment being positioned below the open lower end of the housing.

5. The rice dispensing system as set forth in claim 2, wherein the conveyor system includes a continuous loop belt disposed around a pair of spaced apart rotatable sprockets, the belt having a plurality of spaced apart lips extending upwardly therefrom, the conveyor system including a motor coupled with one of the sprockets.

6. The rice dispensing system as set forth in claim 2, wherein the timer system includes a plurality of activation buttons disposed in the front wall of the housing, each of the buttons activating the conveyor system at predetermined intervals corresponding with a selected quantity of rice to be dispensed into the dispensing funnel.

\* \* \* \* \*